United States Patent
Zehavi et al.

(10) Patent No.: US 12,544,054 B2
(45) Date of Patent: Feb. 10, 2026

(54) AUTOMATED ROBOTIC RETRACTOR

(71) Applicant: Mazor Robotics Ltd., Caesarea (IL)

(72) Inventors: Eli Zehavi, Tel-Aviv (IL); Moshe Shoham, Hoshaya (IL); Yonatan Ushpizin, Glil Yam (IL); Avi Turgeman, Beer Yaakov (IL)

(73) Assignee: Mazor Robotics Ltd., Caesarea (IL)

( * ) Notice: Subject to any disclaimer, the term of this patent is extended or adjusted under 35 U.S.C. 154(b) by 864 days.

(21) Appl. No.: 17/476,094

(22) Filed: Sep. 15, 2021

(65) Prior Publication Data

US 2022/0151714 A1    May 19, 2022

Related U.S. Application Data

(60) Provisional application No. 63/114,964, filed on Nov. 17, 2020.

(51) Int. Cl.
| | |
|---|---|
| *A61B 17/02* | (2006.01) |
| *A61B 34/20* | (2016.01) |
| *A61B 34/30* | (2016.01) |
| *A61B 17/00* | (2006.01) |

(52) U.S. Cl.
CPC .......... *A61B 17/0206* (2013.01); *A61B 17/02* (2013.01); *A61B 34/20* (2016.02); *A61B 34/30* (2016.02); *A61B 2017/00022* (2013.01)

(58) Field of Classification Search
CPC ...... A61B 17/02–17/0293; A61B 34/30–34/77
See application file for complete search history.

(56) References Cited

U.S. PATENT DOCUMENTS

| | | | |
|---|---|---|---|
| 5,201,325 A | 4/1993 | McEwen et al. | |
| 8,597,182 B2 | 12/2013 | Stein et al. | |
| 8,620,473 B2 | 12/2013 | Diolaiti et al. | |
| 9,307,971 B2 | 4/2016 | McKay | |
| 9,486,196 B1 | 11/2016 | Heaton, II et al. | |

(Continued)

FOREIGN PATENT DOCUMENTS

EP        1495724        1/2005

OTHER PUBLICATIONS

Invitation to Pay Additional Fees for International (PCT) Patent Application No. PCT/IL2021/051294, dated Feb. 14, 2022, 10 pages.

(Continued)

*Primary Examiner* — Julianna N Harvey
(74) *Attorney, Agent, or Firm* — Sheridan Ross P.C.

(57) ABSTRACT

Systems and methods for robotic retraction of tissues in a surgical field. Two retractor mechanisms are used on either side of an incision. Each retractor is adapted to be held by a robotic arm, which applies force on the retractor mechanism to pull dissected tissue away from the incision, thus revealing the operative field. A force sensor is employed to measure the force on the retractor, an optional tracking sensor may be used to measure the extent of tissue retraction in two or three dimensions, and both sources of information provided to the robotic controller. By monitoring feedback from either the force sensor or the tracking sensor, the system is able to maintain equal retraction on both sides of the incision. The retractor elements incorporate mechanisms that move down the tissue as the retractors are pulled laterally.

14 Claims, 6 Drawing Sheets

(56) References Cited

U.S. PATENT DOCUMENTS

| | | | |
|---|---|---|---|
| 9,833,254 B1* | 12/2017 | Barral | A61B 17/320068 |
| 10,368,854 B2 | 8/2019 | Pell et al. | |
| 2006/0025656 A1 | 2/2006 | Buckner et al. | |
| 2009/0192360 A1 | 7/2009 | Riess et al. | |
| 2014/0276943 A1* | 9/2014 | Bowling | A61B 34/20 |
| | | | 901/47 |
| 2017/0273678 A1 | 9/2017 | Reimels | |
| 2019/0201118 A1* | 7/2019 | Shelton, IV | A61B 18/00 |

OTHER PUBLICATIONS

International Search Report and Written Opinion for International (PCT) Patent Application No. PCT/IL2021/051294, dated Apr. 4, 2022, 16 pages.

* cited by examiner

AUTOMATED ROBOTIC RETRACTOR

CROSS REFERENCE TO RELATED APPLICATIONS

This application claims priority to U.S. Provisional Application No. 63/114,964, filed on Nov. 17, 2020, and entitled "Automated Robotic Retractor", the entirety of which is hereby incorporated by reference.

FIELD

The present disclosure describes technology related to the field of surgical robotics, especially for mechanisms of automating the retraction of soft tissue.

BACKGROUND

The ability to retract soft tissue that is positioned between a surgical opening or skin incision, and a surgical site which may lie many centimeters below the surface, is an essential component of successful surgical procedures performed in an open operation. Traditional mechanical retractors may employ a scissors-type opening mechanism, or may be simple, one-sided hook-based tools of many shapes, sizes, and applications, depending on the location or surgical procedure for which they are used. More complex retractors, such as the Seton-type retractor, supplied by several major manufacturers of surgical equipment, have also been developed based on a rectangular or circular metal frame with screws to tighten retractor hooks in specific locations, usually under tension or pressure, to enable a larger opening in the tissue. Both scissors-type bilateral retractors and single hook designs, as well as a metal frame with screws, are limited by positioning them repeatedly and manually throughout the application.

A further advance in surgical retraction is to automate the positioning or holding of retractor elements. Several endeavors have been made to design a system with automated control of surgical retractor positioning. A danger with tissue retraction and fixed positioning of a retractor, whether manual or automatic, is applying more pressure than the tissue can withstand without undergoing traumatic damage. Excessive pressure may cause both hypoperfusion and mechanical tissue injury.

The disclosures of each of the publications mentioned in this section and in other sections of the specification, are hereby incorporated by reference, each in its entirety.

SUMMARY

The present disclosure describes new exemplary systems for robotically actuated tissue retraction, which overcome at least some of the disadvantages of existing robotic retractor systems. In one embodiment, the system is based on a set of mechanical retractors that operate on either side of a surgical incision. The system can be used either with a surgeon generated incision, or using a robotic system to generate the incision, the robotic system optionally being the same system as that providing the automatic retraction procedure. A common procedure would be to perform a midline incision or tissue dissection for a spinal fusion procedure. In such a procedure, retraction of several layers of subdermal connective tissue, fascia, and paraspinal muscles is generally needed to enable access to the vertebrae undergoing surgical fusion. With retraction of many layers of tissue, the incision can unintentionally be shifted asymmetrically to one side relative to the deeper tissue layers and the anatomic features on which the operation is to be performed. The surgeon may then also lose his/her reference position with respect to anatomical landmarks in the region of interest.

If the operation is being carried out using a registration process using identification markers on the skin, it is crucial that the deeper tissues on either side of midline maintain their relative position to the midline, or relative to the initial position of the incision relative to the deeper layers of tissue. An accidental shift of the deeper layers of the surgical opening to the right or left of the midline incision has the potential to disrupt the registration process, thereby creating a misalignment between the surgical plan and the actual tissue features. Misalignment by even a few millimeters can result in damage to nerve tissue, having serious consequences for the outcome of a procedure based on, for instance, opening up a vertebral lamina or a vertebral foramen that is only centimeters or even millimeters in diameter. Likewise, in a manually performed dissection procedure, a shift in the surgical field to either side of the intended midline has the potential to mislead the surgeon, as known anatomical landmarks may not be visible in the anticipated location during surgical dissection.

The disclosed system, according to one exemplary implementation, uses a pair of retractors or retractor elements or mechanisms, each held by a robotic retractor arm. Each retractor mechanism is fitted with or connected to a force sensor that determines the lateral force applied to the retractor inserted into an incision, as it is forced outwards by its robotic arms. A predetermined force level is set, based on known safe levels of pressure on a given area of tissue, also therefore based on the width of the retractor elements. For a long period of retraction, this level may correspond to a level of force that would result in a pressure below the diastolic blood pressure of the individual patient, to prevent compression of tissue capillaries which could result in hypoperfusion of the tissue during retraction. For a shorter time period, the acceptable force may be determined by experimental data, or by past experience of safe pressure levels that may be exerted on the specific tissue. The acceptable level of retraction force would be greater, for example, on muscle tissue vs. blood vessels or nerves. The force sensors are designed to apply the requisite pressure at any given location. In some implementations, feedback from the force sensors is used in conjunction with position information provided by tracking sensor(s), or by the robotic arm position as determined by the robotic controller, such that the force is automatically adjusted according to the tissue location to keep the dissection in its intended location.

In other implementations, tracking sensors alone are used to monitor the retraction. Distance measurements may be more useful than force sensing in operations in which the tissue composition differs on each side of the incision, such as in a corrective procedure in which scar tissue tends to complicate the dissection because of random distribution on either side of the incision. A second use for distance measurements may be in operations in which the skin incision is not along a midline axis, such that the internal tissues differ on either side of the incision.

Another important feature of the retractor design is that the applied force and resulting pressure are calibrated such that each robotic arm applies the same force, so that each retractor exerts the same pressure on the tissue on which it is deployed to retract. This equality of pressure should result in equal retraction on each side of the incision, typically on each side of the midline, thus preventing shifts in the underlying soft tissues relative to the surface, which could interfere with the registration process. The retraction process is dynamic, such that the robotic arms exert the allowed force on the retractors, automatically moving the tissue farther away from midline, from either side of the initial incision, as the surgeon or another robotic arm performs deeper tissue dissection in the area of the surgical field.

A number of dynamic retractor mechanisms may be employed, instead of simple static grippers, such mechanisms being configured to move down into the retracted tissue region as the dissection proceeds. Typical examples include those based on a rotating belt or tank track, which crawl down into the tissue opening, or based on interdigitating elongated finger elements which also provide such a crawling motion. Any mechanism that allows movement of the retractor relative to the incision and underlying tissue, without causing mechanical damage to the soft tissues, may be used. A tracking or position sensor may be used to record the position of the retractor relative to the surface, providing an additional means of correlating the equivalence of retraction on both sides of midline.

An exemplary implementation of the use of the system may include the following steps, in no particular order:
  i) robotically inserting the retractors into the initial surgical incision;
  ii) retracting the tissue as allowed by the size of the incision, up to a predetermined safe level of pressure;
  iii) holding the retractors in the position at which maximal pressure is exerted;
  iv) a further step of tissue dissection, which releases pressure on the retractors and hence reduces the force measured by the force sensors; and
  v) based on the reduced measured force on the retractor arms, automatically continuing the retraction motion until the pressure on the tissues again reaches the predetermined safe level, and
  vi) repeating steps (iii) to (v) until the full desired extent of retraction has been achieved.

The disclosed methods may be typically performed by a system comprising a memory configured to store the force readings, predetermined or preprogrammed allowable force and pressure readings, and an operative plan and a processor, and in addition, at least some of a database; interfaces for the user, a tracking sensor, and a force sensor.

There is thus provided in accordance with an exemplary implementation of the devices described in this disclosure, a system for bilateral robotic retraction of tissue, comprising: two robotic arms, each having a retractor element at its distal portion; a force sensor disposed on each retractor element or at a point along its associated robotic arm, each force sensor being adapted to provide an output signal according to the force exerted by its associated retractor element on the tissue; and a controller adapted to receive the output signals, and to control the motion of the robotic arms such that motion of the two retractor elements is generated in opposing directions away from a surgical opening, the motion continuing until a predetermined allowable limit of force, based on the output signal provided by the force sensors, is achieved.

The predetermined level of force is selected such that an allowable pressure exerted by each retractor element on the tissue it retracts is less than the pressure level at which damage would be caused to that tissue. The system may further comprise at least one tracking sensor adapted to track the position of a retractor element, with the output signals generated by the tracking sensor enabling the controller to confirm that each retractor element is located at an equal distance from the surgical opening. Alternatively, the coordinate system of the controller may be employed to track the position of the robotic arms to which the retractor elements are attached. In the system, at least one retractor element comprises two connected sets of interdigitating fingers, a first set of fingers being fixedly attached to the robotic arm, and a second set being pivotally connected to the first set of fingers in their proximal region, and attached to the first set of fingers by a rotating crank element at their distal end, such that eccentric rotation of the distal end of the second set of fingers generates a crawling motion of the retraction element.

A system for bilateral robotic retraction of tissue, comprising: two robotic arms, each having a retractor element positioned at its distal portion; a tracking sensor providing output signals according to the position of its associated retraction element; and a controller adapted to position the robotic arms to maintain an equal and opposing lateral retraction of each retractor element from its initial position in the tissue, using the output signals of the tracking sensor. The system may further comprise a force sensor to measure the force applied on each retractor element, such that the controller is configured to exert an outwards motion of the retracting elements so long as the force measured by the force sensors is less than a predetermined level. The predetermined level of force may be such that the pressure exerted by a retracting element on the tissue it retracts, is less than the level at which damage would be caused to the tissue.

A system for retracting tissue equally on either side of a surgical incision, comprising: an adapter for providing equal and opposite angular motion to two arms attached to the adaptor, each arm having a retractor element at its distal end, and a force sensor associated with each arm, each force sensor adapted to measure the force exerted between each retractor element and a tissue on which the retractor element is acting, wherein, when the two retractor elements are deployed on opposite sides of a surgical incision, the arms are retracted in accordance with the force measured by the force sensors, until a predetermined allowable limit of force is achieved, the retraction of the tissue being equal and opposite on either side of the incision.

The retractor element may comprise two connected sets of interdigitating fingers, one set of fingers being immobile and the other set being pivotally connected to the first set of fingers in their proximal region, and attached to the first set of fingers by a rotating crank element at their distal end, such that eccentric rotation of the distal end of the second set of fingers generates a crawling motion of the retraction element. The retractor mechanism may comprise a belt, tread, or chain drive adapted to generate the downward motion of the retractor element into the retraction opening. Equal and opposite retraction forces may ensure that the cut tissues remain in place on either side of the incision relative to initial incision position on the skin, such that the tissue in the operative field better retains its registration with an operative plan prepared for execution by a robotic surgical system. When a predetermined maximal force is reached, the robotic arm may be adapted to maintain the adapter extensions holding the retractors in the present position. The adapter extensions may be designed to open/separate equally from a midpoint.

A method for retracting tissue in a robotically controlled surgical procedure may comprise the following steps in no particular order:
  i) inserting into a surgical incision a pair of retractor elements, each held by a robotically controlled arm and provided with a force sensor;

ii) moving the robotic arms apart such that a force is generated on the tissue by the retractor elements and detected by their associated force sensors, each force sensor adapted to generate an output signal according to the force exerted by its associated retractor element on the tissue;

iii) providing to a controller the output signals indicating the force applied by each retractor element on the tissue;

iv) using the controller to adjust the motion of each robotic arm such that the force exerted by each retractor element is equal and does not exceed a predetermined level;

v) when the output signal provided by the force sensors indicates that a predetermined allowed maximum level of force is reached, enabling a further dissection of the tissue to enable the retraction to widen; and vi) repeating steps (ii) to (v) until the full desired extent of retraction has been achieved, keeping the force exerted by each retractor element on the tissue below a predetermined level.

In the method, the position of tissue retraction is tracked, such that the controller can maintain an equal distance of retraction on either side of the dissection. The retractor elements may be held by a two-arm adapter connected to a single robotically controlled arm.

Another method for retracting tissue in a robotically controlled surgical procedure may comprise: inserting a pair of retractor elements, each held by a robotically controlled arm, into an initial surgical incision; actuating the robotic arms to retract the tissue to an extent such that the force exerted by the retractor elements on the tissue does not exceed a predetermined permitted level; performing a further step of tissue dissection, thus releasing the force exerted by the retraction elements on the tissue; continuing actuation of the robotic arms to an extent such that the force exerted by the retractor elements on the tissue does not exceed the predetermined permitted level, so that the retraction extent widens; and repeating steps iii) and iv) until the full desired extent of retraction has been achieved. In the method, equal and opposite retraction forces ensure that the cut tissues remain in place on either side of the incision relative to its initial position on the skin, such that the tissue in the operative field better retains its registration with an operative plan prepared for execution by a robotic surgical system.

BRIEF DESCRIPTION OF THE DRAWINGS

The present disclosure will be understood and appreciated more fully from the following detailed description, taken in conjunction with the drawings in which.

DETAILED DESCRIPTION

Figure 1A:
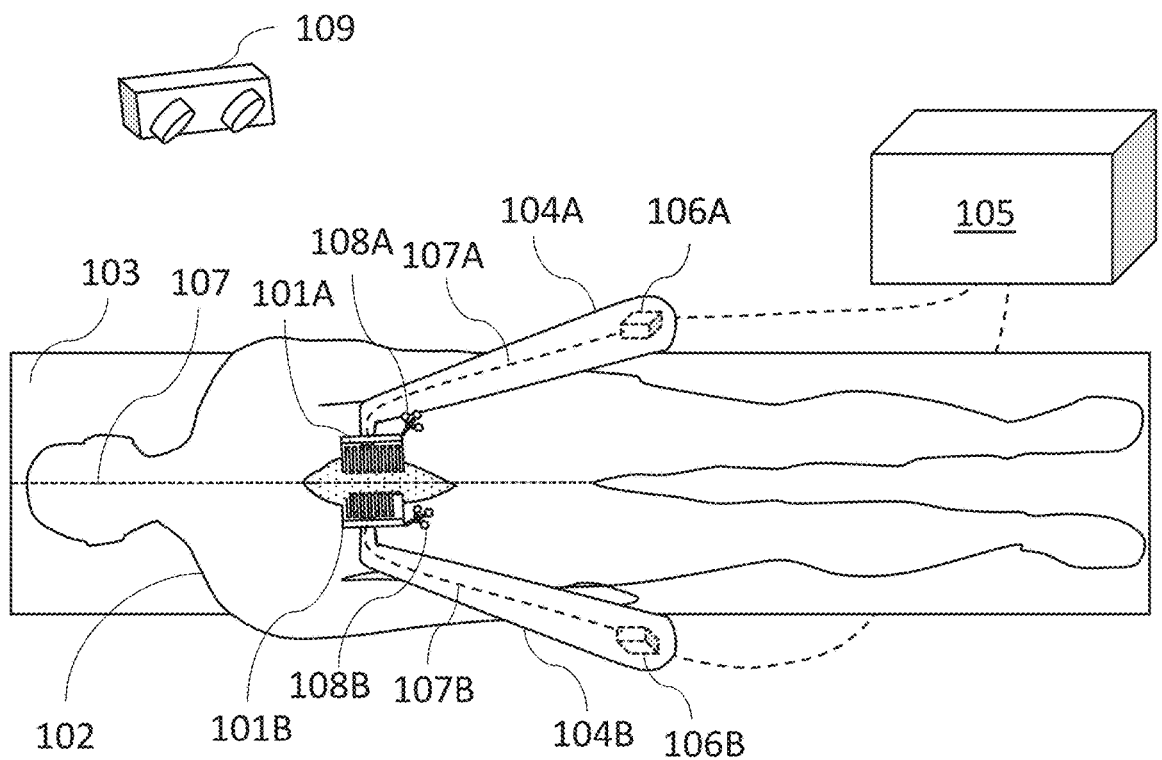
FIG. 1A depicts a top view of a retractor mechanism held by robotic arms according to at least one embodiment of the present disclosure.
Figure 1B:
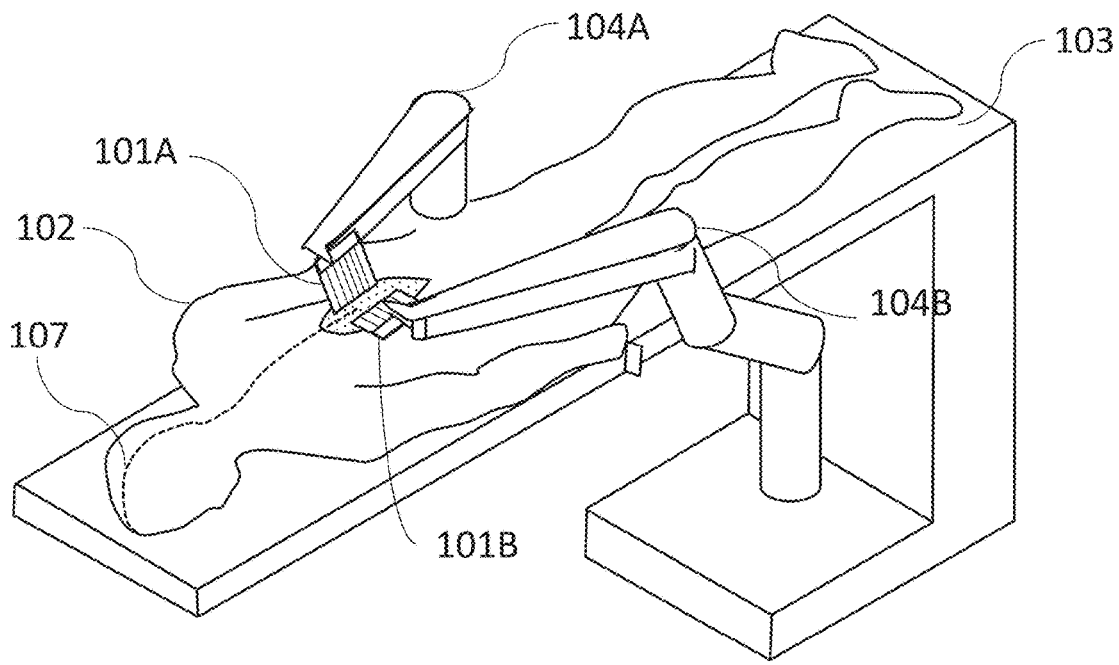
FIG. 1B depicts a perspective view of a retractor mechanism held by robotic arms according to at least one embodiment of the present disclosure.

Reference is made to FIGS. 1A and 1B, which illustrate schematically an exemplary implementation of a system described in this disclosure, as viewed from above (FIG. 1A) and in an isometric view (FIG. 1B). In this implementation, a subject 102 is shown lying prone on an operating table 103, positioned for a surgical procedure on the spinal column by means of a superior-inferior incision of the midline 107. Typically, the surgeon makes a midline incision through the epidermis, dermis, and underlying fascia and connective tissue, followed by retraction of the open tissue edges, tissue dissection, and then further retraction, until the underlying bony structures of the vertebrae are exposed. The system shown comprises two robotic arms 104A and 104B, which are manipulated using a robotic controller 105. To each robotic arm 104A, 104B is attached a retractor mechanism 101A, 101B, respectively. Further attached either to each robotic arm 104A, 104B or to each retractor element 101A, 101B is a force sensor 106A, 106B that detects the force applied on each retractor element. It will be appreciated that in some embodiments, the retractor element 101A, 101B may not include the force sensor 106A, 106B. The force sensor may be situated in a number of locations. It may be integrated into the robotic arm, as shown in FIG. 1A, and communicate with the controller. In other implementations, dedicated force sensors may be incorporated into the retractor elements themselves, or may be associated with the robotic joint. The controller 105 receives the output signal from the force sensor, representing the force applied on each retractor element by the robotic arm to which the retractor element is attached. In a typical embodiment of the methods, the controller regulates the movement of each retractor element so that the force applied to each is the same. Equal application of force allows the two retractors to exert equal traction on either side of the incision, thereby preventing diversion of the opening to either side of midline because of unequal forces applied to the underlying connective tissue.

In some embodiments, each retractor mechanism 101A, 101B may not be attached to each robotic arm 104A, 104B, respectively. As an alternative to identifying the positions of the retractor elements by using a knowledge of the position of the robotic arms, from the robot system controller, the position of the retractors can be determined by use of a tracking system 109, and at least one tracking element such as tracking elements 108A and 108B attached to the retractor elements. In addition to the outward lateral motion generated by the system, each retractor end may have a motion mechanism that applies downward motion of the retractor into the dissection region as it opens.

Figure 2A:
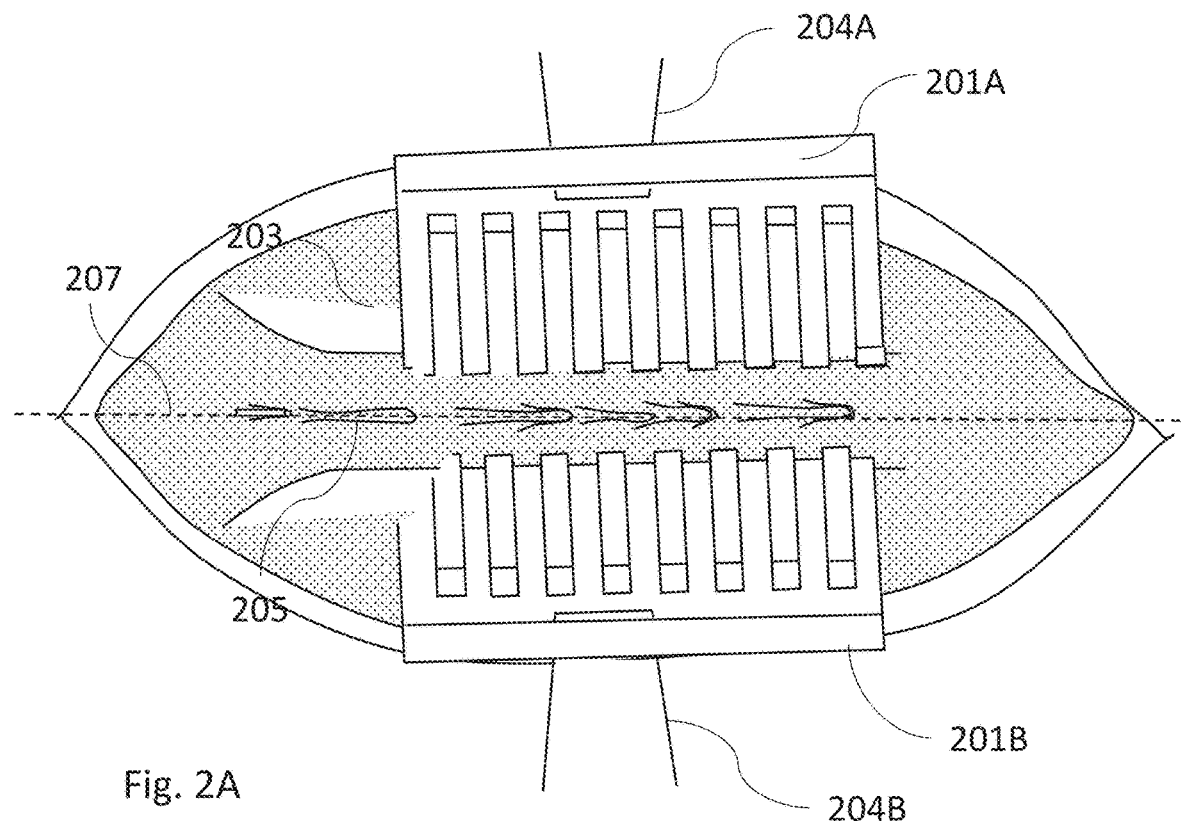
FIG. 2A depicts a top view of a retractor mechanism according to at least one embodiment of the present disclosure.
Figure 2B:
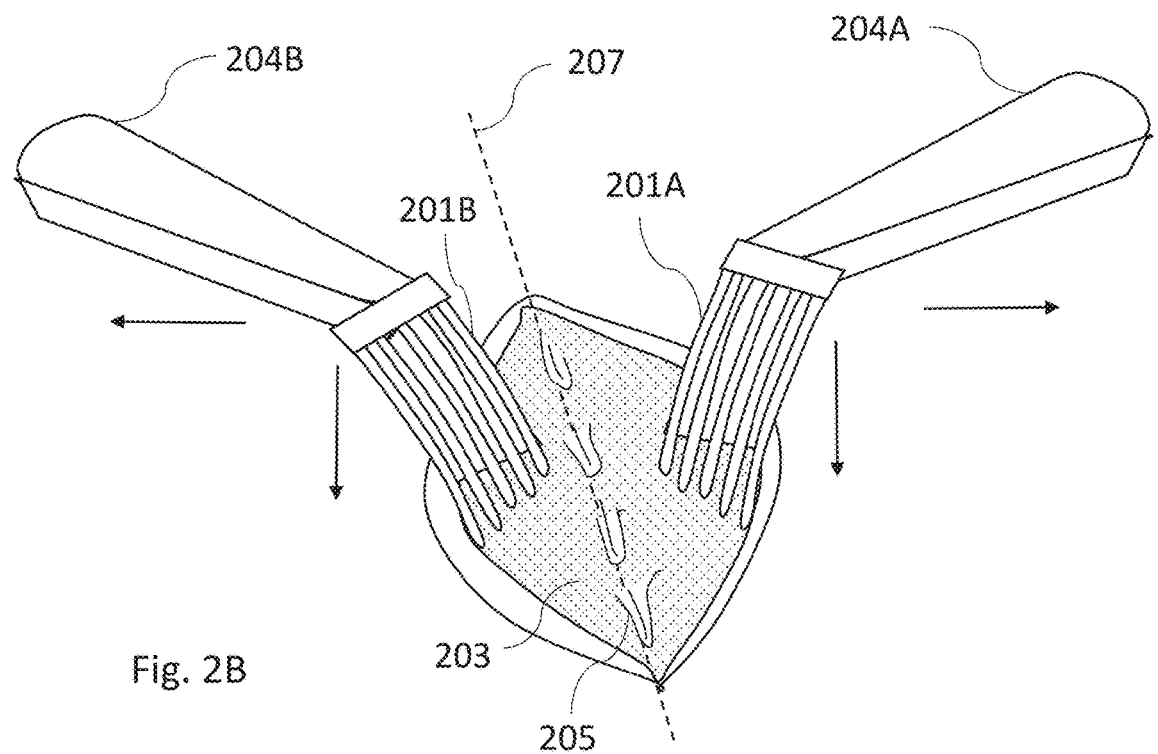
FIG. 2B depicts a perspective view of a retractor mechanism according to at least one embodiment of the present disclosure.
Figure 3A:
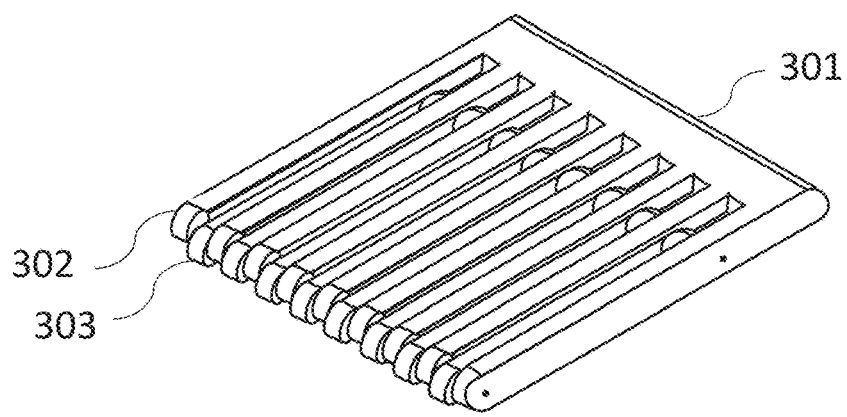
FIG. 3A depicts a perspective view of a retractor mechanism according to at least one embodiment of the present disclosure.
Figure 3B:
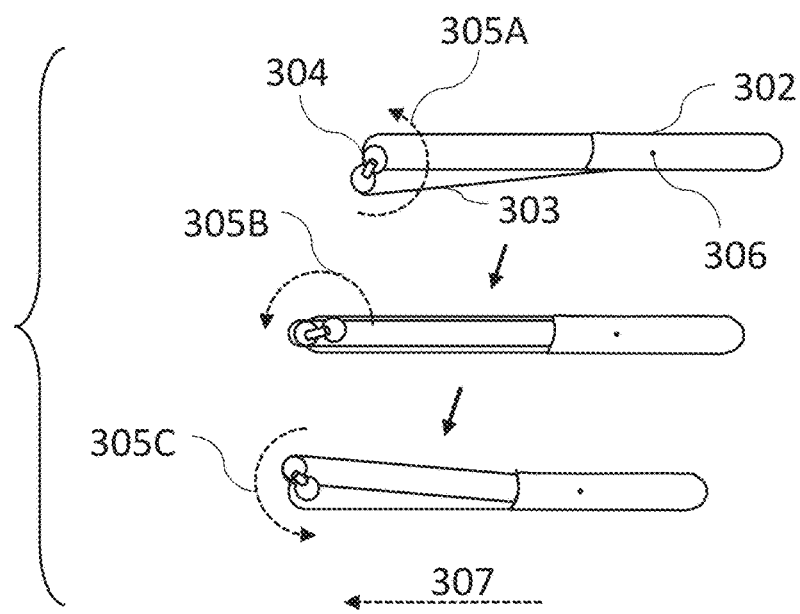
FIG. 3B depicts a side view of a retractor mechanism according to at least one embodiment of the present disclosure.
Figure 4:
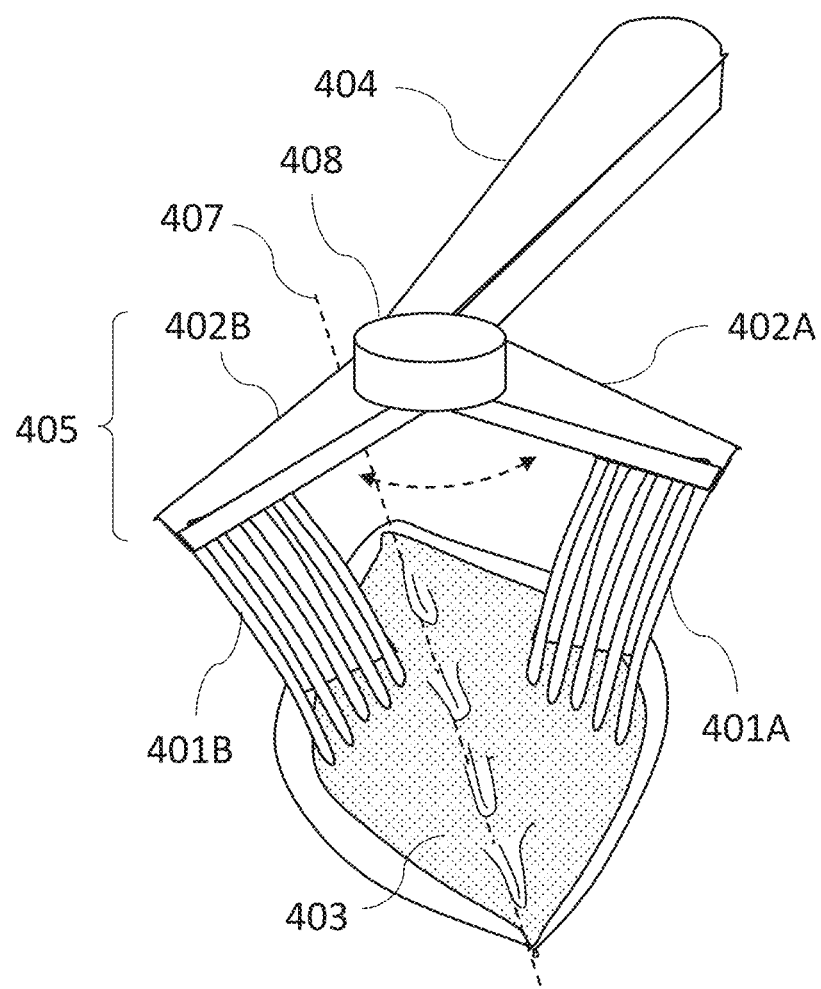
FIG. 4 depicts a perspective view of a retractor mechanism held by robotic arms according to at least one embodiment of the present disclosure.

In embodiments where each retractor mechanism 101A, 101B is attached to respective robotic arms 104A, 104B, as the robotic arm pulls the retractor elements laterally apart, the retractor motion mechanisms, such as the track or the mobile fingers described in more detail in FIGS. 3A, 3B, and 4, dig into the tissue, providing a downward motion. Thus, the combination of lateral and downward forces ensures that the full depth of the dissected tissues are moved apart in three-dimensional space as the surgeon or robotic system lengthens the incision or dissects deeper into the tissue, as illustrated more clearly in FIGS. 2A and 2B.

Reference is now made to FIGS. 2A and 2B, showing top and isometric views of the retractor elements shown in FIGS. 1A and 1B. The size and shape of the retractor elements 201A and 201B are designed to minimize their three-dimensional profile and enable a clear view of the area of the surgical field. Each retractor mechanism is held by a robotic arm 204A, 204B, which applies force on the frame of the retractor to which the arm is attached, on either side of the midline 207 of the surgical field. It will be appreciated that in some embodiments, each retractor mechanism may not be held by robotic arm 204A, 204B. For example, each retractor mechanism may be held by, for example, a user such as a medical provider. In other examples, each retractor mechanism may be supported by a support structure or may be self-supporting.

In embodiments where the retractor mechanism is held by robotic arm 204A, 204B, regulation of the force applied on the retractor, particularly the lateral outward force, is performed by the robotic surgical system using input from the force sensors, according to predetermined maximum allowable forces. At the point of the surgical procedure shown in FIGS. 2A and 2B, the vertebral processes 205 have been exposed within the surgical field 203. In FIG. 2B, as the robotic arms 204A, 204B apply lateral force on the retractor elements in a direction away from the midline 207, the motion of the mobile components of the retractor elements 201A, 201B against the tissue causes the retractor elements to perform a downward movement over the tissue. The two pairs of arrows in FIG. 2B show these modes of motion. Exemplary retraction mechanisms are discussed further in FIGS. 3A and 3B, and 4. Obtaining the desired angle between the retractor elements and the tissue being retracted may be obtained by manipulating the position of the robotic arms, which have at least two degrees of freedom, as shown in FIG. 1B. The joint between the robotic arm and the retractor element may be fixed, or at least controlled, such that the three-dimensional coordinates of both the robotic arm and the retractors are known to the controller, and tracking sensors measure the extent of retraction in three-dimensional space.

Reference is now made to FIGS. 3A and 3B, showing a first exemplary implementation of the retractor mechanism 301 in isometric (FIG. 3A) and side (FIG. 3B) views. The configuration illustrated in FIGS. 3A and 3B is based on two sets of interdigitating fingers 302, 303, but it is to be understood that other mechanisms could be used for the mechanical retraction. One set of fingers 302 is rigidly attached to the frame of the retractor mechanism 301. The second set is comprised of a series of individual mobile elongated elements 303 configured to pivot at one end around a pivot point 306, while the other end revolves using a crank rod around a pin 304, such that the circular movement of the remote end of the mobile fingers 303 results in a forwards crawling movement of the retractor mechanism relative to the underlying surface with which it is in contact; in most cases, this will be the muscle, fascia, or other soft tissues, located between the skin incision and the surgical field such as a vertebral lamina or foramen. In FIG. 3B, the curved arrows 305A, 305B, and 305C represent rotation of the mobile element 303 around the crank axis 304, resulting in relative linear motion represented by arrow 307.

Figure 3C:
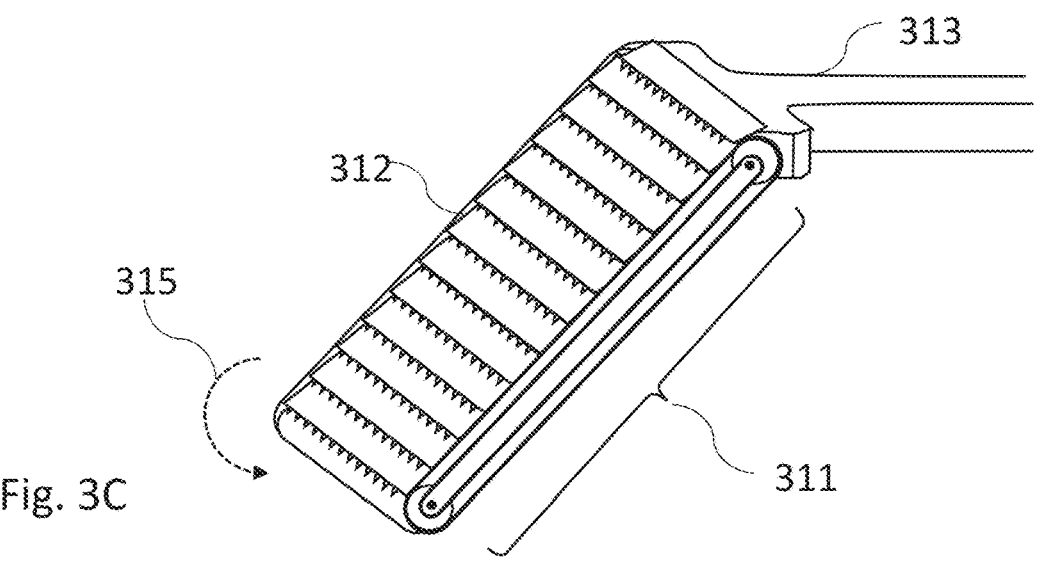
FIG. 3C depicts a perspective view of a retractor mechanism according to at least one embodiment of the present disclosure.

Reference is now made to FIG. 3C, showing another exemplary implementation of the retractor, based on a conveyor belt, chain link, or tank tread mechanism 311 that allows continuous motion 315 of individual tread or grasping elements 312 around the track axes. The grasping elements 312 may have a rough surface to provide moderate friction and thus enable the retractor mechanism to hold the soft tissue as it retracts. As with the interdigitating finger apparatus in FIGS. 3A and 3B, the retractor belt 311 mechanism is attached to a robotic arm 313 of the robotic retractor system, which via a force sensor, monitors the force applied on the retractor mechanism as it retracts the tissue. In some implementations of both FIGS. 3A and 3B, and of FIG. 3C, the retractor elements are connected to the robotic arm through a spring-loaded joint, which provides a constant counter force to the lateral force provided by the robotic arms. In some implementations, a means of determining the area of the retractor in contact with the tissue may be applied, for the purpose of calculating the maximal area in contact with the tissue. This information can thus be used to calculate the total pressure on the tissue, based on Pascal's law, that pressure=force/area.

Whereas a typical implementation of the disclosed methods may be used for equal retraction on either side of a midline incision in an initial operation on a patient, additional implementations of the system may be relevant in other operations. In one implementation, the disclosed methods are applied to a repeat spinal fusion, in which application of equal pressure on either side of the incision does not result in equal retraction, because of the presence of scar tissue. In such a case, the tracking sensor may be used in place of or in addition to the force sensor, such that the degree of retraction is based on distance rather than, or in addition to, applied force. In other surgical procedures, the incision is not midline; in such a case, the force to obtain equal retraction on either side of the incision may be unequal. In this case, again, the tracking sensor and distance measurements may be more accurate in obtaining equal retraction.

Reference is now made to FIG. 4, illustrating an implementation of the disclosed methods comprising a single robotic arm 404 with a Y-shaped adapter 405 having two spreader arms or extensions 402A, 402B, each holding a retractor element 401A, 401B. In this implementation, the force sensors are integrated into the retractors, and read the force applied on each retractor element via the spreader arms. In other implementations, each retractor element 401A, 401B may not have a force sensor. The spreader arms may have correlated symmetrical movement by a simple gearing joint, or they may be separately controlled at the Y-joint 408, in which case each spreader arm or extension 402A and 402Bb may be considered to be independent robotic arms, as in the implementation of FIGS. 1A and 1B. Feedback is provided to the controller, which responds to the force measurement feedback by adjusting the extension apart of the spreader arms 402A, 402B. An advantage of the simple symmetrical motion implementation of FIG. 4 is that the controller knows the position of each component: the robotic arm, the spreadable arms, and the retractor elements, relative to the central axis of the initial incision, thus enabling the controller to maintain the retractor elements in the same relative position on either side of the skin incision, as the dissection proceeds internally. The ability to maintain the bilateral retractor elements or arms in a constant position relative to the lateral position of the incision on the skin (x-axis) as the dissection proceeds into the depth of the opening (z-axis), or relative to the midline of the patient in the case of a midline incision, is accomplished by the controller knowing the three-dimensional coordinates of the robotic arm relative to the patient. The robotic arm, the Y-shaped spreader, and the patient have fixed relative positions, such that outward movement of the retractor elements maintains the same distance on either side of the initial incision.

Figure 5:
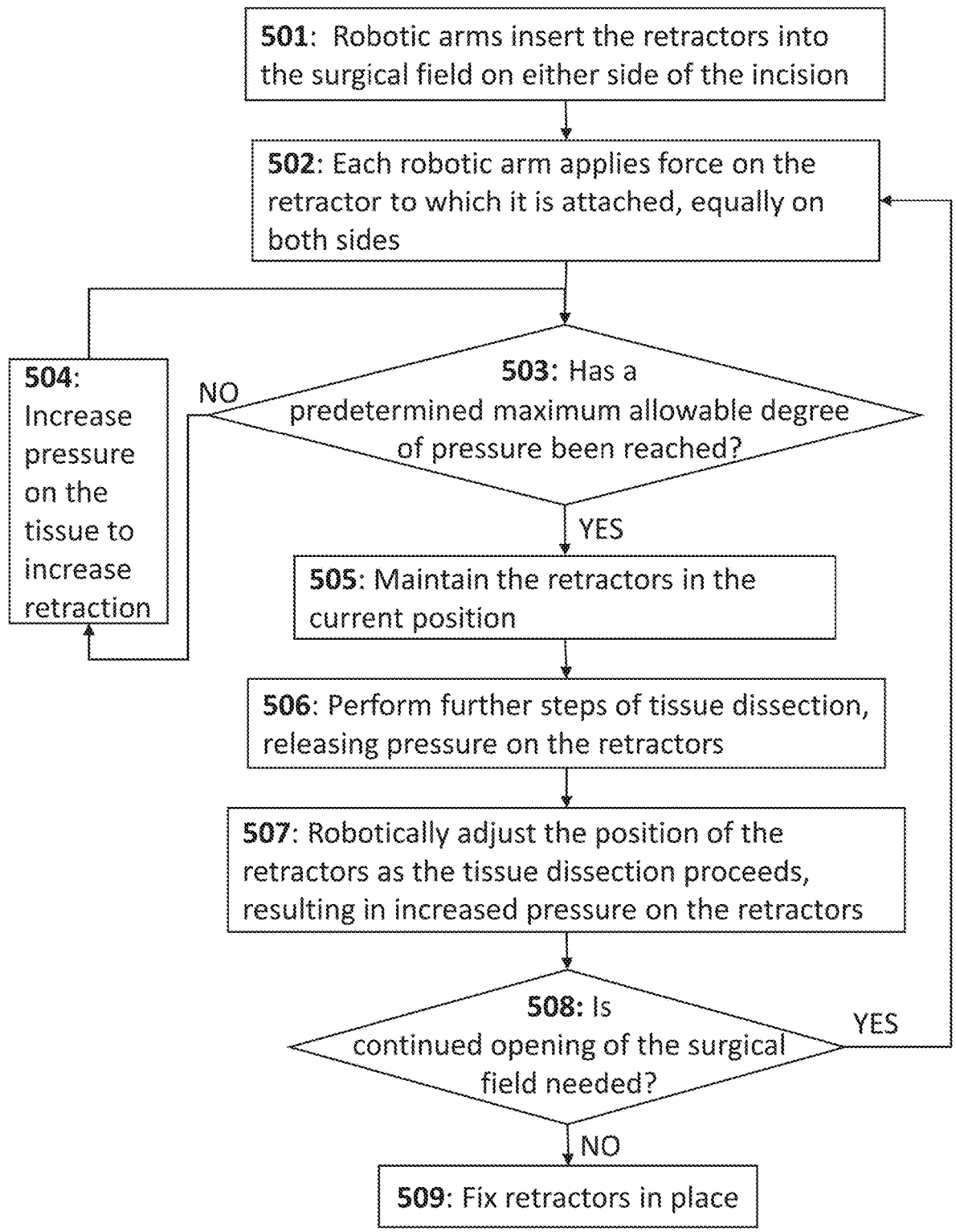
FIG. 5 is a flowchart showing an implementation of the disclosed methods.

Reference is now made to FIG. 5, a flowchart illustrating the steps taken in an exemplary embodiment of the disclosed methods. After a surgical incision has been made, in step 501 the retractors attached to the robotic arms are inserted into the surgical field on either side of the incision. It will be appreciated that in some embodiments, the retractors may be inserted into the surgical field by, for example, a user such as a surgeon or other medical provider. In still other embodiments, the retractors may be supported by a mechanisms attached to the bed or a mechanism based on or attached to the floor. In step 502, force is applied on each retractor by the robotic arm to which it is attached, the force being applied equally on both sides of the incision, which is typically along the dorsal midline. In step 503, the system, monitoring the force applied on the retraction elements and measured by the force sensors, determines if a predetermined maximum allowable degree of force or pressure has been reached. If so, in step 505, the robotic arms maintain the retractors in the current position. If not, in step 504, pressure is increased on the tissue to intensify the retraction. In step 506, a further step of tissue dissection is performed either robotically or by the surgeon, thereby releasing pressure on the retractors. In step 507, the robotic arms automatically adjust the position of the retractors in at least one of a lateral direction or deeper into the underlying tissues, as the tissue dissection progresses. This step continues until the pressure reaches the maximum allowed pressure. In step 508, the system assesses the continued need for the continued robotic retraction process by determining if full exposure of the field has been accomplished. If not, continued robotic retraction is needed, and the method returns to step 502. Thus, this process, from steps 502 to 508, is an iterative loop that repeats itself while the dissection and retraction is being performed. If the opening and the need for retraction have been achieved in step 508, the surgeon or the controller of the robotic system fixes the retractor positions so that the surgical procedure can proceed, as in step 509, thus ending the robotically controlled retraction procedure.

Figure 6:
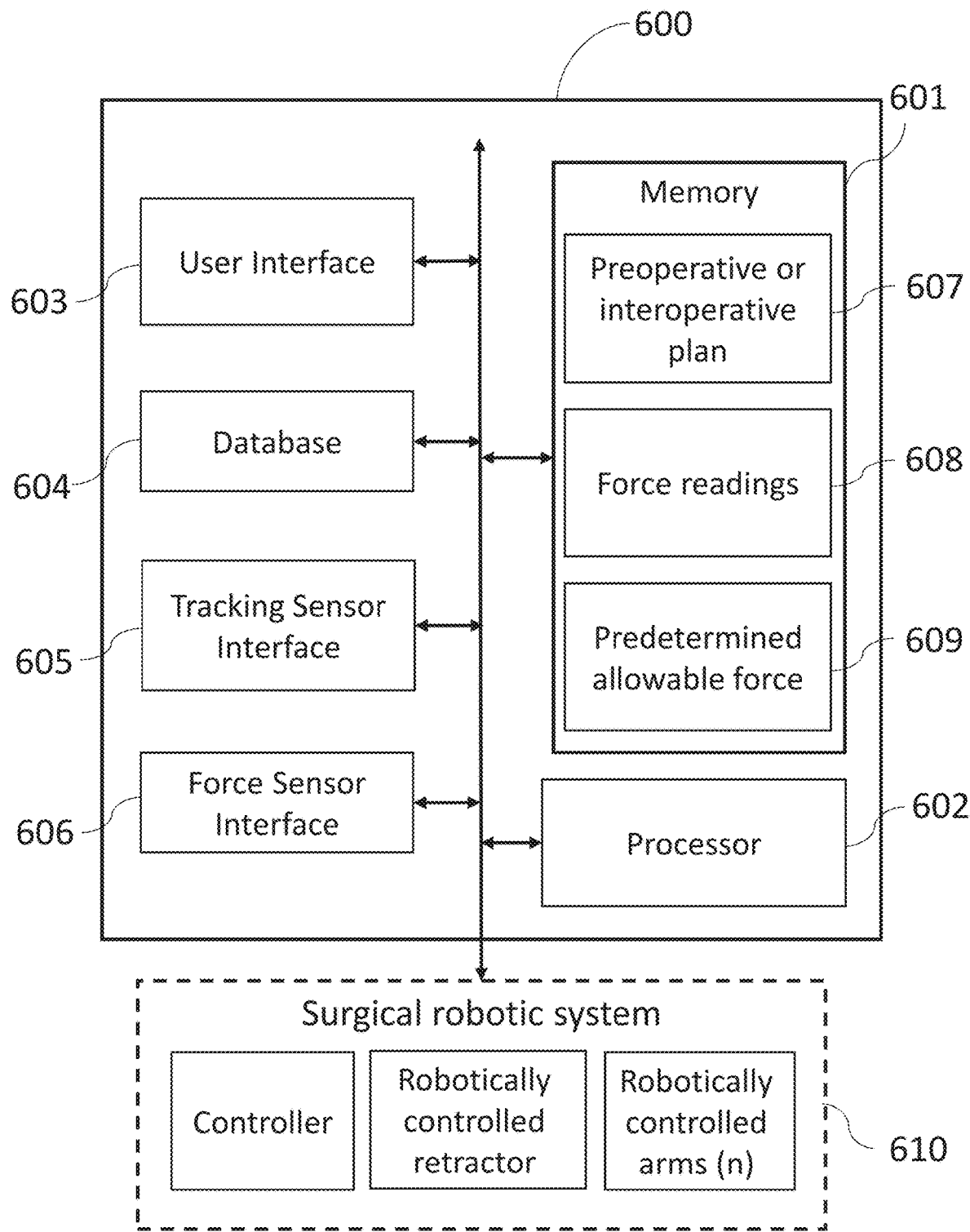
FIG. 6 shows a system configured to carry out an exemplary implementation of disclosed methods.

Reference is now made to FIG. 6, showing an exemplary structure of a control system 600 configured to carry out the methods of the present disclosure. The exemplary system shown 600 comprises a memory (RAM) 601, a processor 602, a user interface 603, optionally a database 604, a tracking sensor interface 605, a force sensor interface 606. The memory 601 may be comprised of a preoperative or intraoperative plan 607, force readings 608 from the force sensor measuring force on the retractor mechanism, and predetermined allowable forces on the retractor 609 for any given stage of the operative procedure. The optional database 604 may comprise information on the acceptable levels of force and pressure that may be applied to a given tissue or for a specific operative procedure. The system 600 is in contact with a robotic system 610, comprised of a controller, robotically controlled arms, and robotically controlled retractor mechanisms.

In this disclosure, the term system may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components, such as optical, magnetic, or solid state drives, that provide the described functionality; or a combination of some or all of the above, such as in a system-on-chip. The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this disclosure may be partially or fully implemented by one or more computer programs executed by one or more processors. The computer programs include processor-executable instructions that are stored on at least one non-transitory tangible computer readable medium. The computer programs may also include and/or rely on stored data.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

It is appreciated by persons skilled in the art that the present disclosure is not limited by what has been particularly shown and described hereinabove. Rather the scope of the present disclosure includes both combinations and sub-combinations of various features described hereinabove as well as variations and modifications thereto which would occur to a person of skill in the art upon reading the above description and which are not in the prior art.

What is claimed is:

1. A system for bilateral robotic retraction of tissue, comprising:
   two robotic arms, each having a retractor element at its distal portion, each of the two robotic arms configured to apply a lateral force from a midline;
   a force sensor associated with each retractor element, each force sensor being adapted to provide an output signal according to the force exerted by its associated retractor element on the tissue; and
   a memory configured to store an operative plan for execution by the system; and
   a controller configured to: receive the output signals, control a motion of the robotic arms, and maintain forces applied by the two retractor elements below a predetermined allowable limit of force, such that motion of the two retractor elements is generated in opposing directions away from a surgical opening, applying a retracting force in an equal magnitude on each retractor element, wherein the controller further assigns identification markers to one or more tissue features creating one or more registered tissue features, and wherein the controller further aligns the one or more registered tissue features with the operative plan and maintains the tissue on either side of the midline to stay in a relative position to the midline.

2. The system according to claim 1, wherein the predetermined allowable limit of force is selected such that an allowable pressure exerted by each retractor element on the tissue it retracts is less than the pressure level at which damage would be caused to that tissue.

3. The system according to claim 1, further comprising one or more tracking sensors adapted to track a position of each retractor element, wherein the one or more tracking sensors output signals enabling the controller to confirm that each retractor element is located at an equal distance from the surgical opening.

4. The system according to claim 1, wherein the controller uses a robotic co-ordinate system to maintain an equidistant position of the retractor elements from their initial positions at a commencement of a retraction process.

5. The system according to claim 3, wherein at least one of the retractor elements comprises a moving set of protrusions positioned to grip the tissue surface, such that an upward motion of the protrusions generates an associated downward motion of the retractor element into the retraction opening.

6. The system according to claim 5, wherein one or more of the tracking sensors measures an extent of retraction in three-dimensional space, such that the position of the tissue relative to that determined in the operative plan can be verified.

7. The system according to claim 6, wherein the controller is adapted to actuate the motion of the protrusions in the retractor elements in accordance with the measured extent of retraction.

8. The system according to claim 1, wherein at least one of the retractor elements comprises two connected sets of interdigitating fingers, a first set of fingers being fixedly attached to the robotic arm, and a second set being pivotally connected to the first set of fingers in their proximal region, and attached to the first set of fingers by a rotating crank element at their distal end, such that eccentric rotation of the distal end of the second set of fingers generates a crawling motion of the retraction element.

9. The system according to claim 1, wherein at least one of the retractor elements comprises a belt, tread, or chain drive adapted to generate the downward motion of the retractor element into the retraction opening.

10. The system according to claim 1, wherein the controller is adapted to maintain a position of the robotic arms holding the retractors when a predetermined force is reached.

11. The system according to claim 1, wherein the midline is a dorsal midline, the surgical opening is an incision along the dorsal midline of a subject, and the tissues being retracted are muscles.

12. A system for bilateral robotic retraction of tissue, comprising:
two robotic arms, each having a retractor element positioned at its distal portion, wherein each of the two robotic arms applies a lateral force from a midline, and the retractor elements perform a downward movement over the tissue;
a sensor providing output signals according to the position of its associated retraction element; and
a memory configured to store an operative plan for execution by the system; and
a controller adapted to position the robotic arms to maintain an equal and opposing lateral retraction of each retractor element from its initial position in the tissue, using the output signals of the sensor, applying a retracting force in an equal magnitude on each retractor element,
wherein the controller further assigns identification markers to one or more tissue features creating one or more registered tissue features, and
wherein the controller further aligns the one or more registered tissue features with the operative plan and maintains the tissue on either side of the midline to stay in a relative position to the midline.

13. The system according to claim 12, further comprising a force sensor to measure the force applied on each retractor element, such that the controller is configured to exert an outwards motion of the retracting elements so long as the force measured by the force sensors is less than a predetermined level.

14. The system according to claim 13, wherein the predetermined level of force is such that a pressure exerted by a retracting element on the tissue it retracts, is less than the level at which damage would be caused to the tissue.

* * * * *